United States Patent [19]

Fukuda

[11] 4,418,772

[45] Dec. 6, 1983

[54] COMBINATORIAL WEIGHING METHOD AND APPARATUS THEREFOR

[75] Inventor: Masao Fukuda, Shiga, Japan

[73] Assignee: Kabushiki Kaisha Ishida Koki Seisakusho, Kyoto, Japan

[21] Appl. No.: 368,004

[22] Filed: Apr. 13, 1982

[30] Foreign Application Priority Data

Apr. 14, 1981 [JP] Japan ................................. 56-56672

[51] Int. Cl.³ ........................................... G01G 13/00
[52] U.S. Cl. ......................................... 177/1; 177/25; 177/165
[58] Field of Search ...................... 177/1.1, 25, 52, 59, 177/165

[56] References Cited

U.S. PATENT DOCUMENTS

| | | | |
|---|---|---|---|
| 3,939,928 | 2/1976 | Murakami | 177/25 |
| 4,308,928 | 1/1982 | Oshima | 177/25 |
| 4,344,492 | 8/1982 | Hirano | 177/25 |

Primary Examiner—Joseph W. Hartary
Attorney, Agent, or Firm—Staas & Halsey

[57] ABSTRACT

A combinatorial weighing method and apparatus therefor, the apparatus being of the type which includes a plurality of buckets for carrying articles to be weighed, a conveyor for conveying each of the buckets, and a weight sensor for sensing the weight of each bucket. The method includes steps of storing in memory the empty weight of each bucket following the measurement thereof by the weight sensor, storing in memory the total weight of each bucket and the articles introduced into the bucket, the total weight being measured by the weight sensor, finding the weight of the articles in each bucket by subtracting from the total weight of the bucket and its articles the empty weight of the bucket, selecting, on the basis of weights of the articles, the combination of articles whose overall weight is equal or closest to a preset target weight, and releasing the selected articles from the buckets which carry them.

6 Claims, 7 Drawing Figures

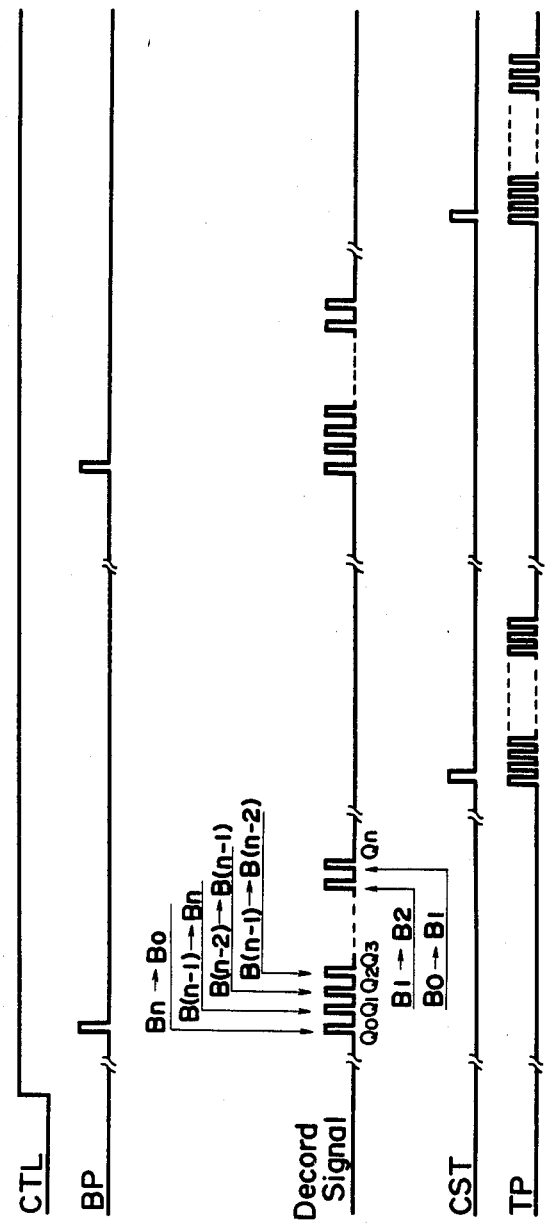

and APPARATUS THEREFOR

COMBINATORIAL WEIGHING METHOD AND APPARATUS THEREFOR

BACKGROUND OF THE INVENTION

This invention relates to a combinatorial weighing method and apparatus and, more particularly, to a combinatorial weighing method and apparatus for conveying a plurality of buckets by means of a conveyor, each bucket carrying a quantity of articles to be weighed, finding the weight of the articles in each bucket, and discharging from selected buckets those articles which, in combination, give a total weight equal or closest to a preset target weight, which combination of articles is referred to as the "best" combination.

It is often required to weigh out highly accurate quantities of articles that vary in weight from one to another. Examples of such articles are vegetables and fruits, confectioneries, perishables, fabricated articles, etc. When weighing out quantities of lettuce, for example, wide disparities in weight can be noticed from one head to another. In order to weigh such articles it is general practice to make use of a combinatorial weighing apparatus (computer scale) that relies upon a computer.

A combinatorial weighing apparatus is adapted to weigh articles automatically by measuring the weights of articles which have been introduced into a plurality of weighing hoppers, selecting the combination of articles whose total weight is equal or closest to a preset target weight, discharging the selected articles from the weighing hoppers which contain them, and then replenishing these hoppers with articles to prepare for the next weighing cycle. Repeating these operations provides batches of the articles, each batch having a total weight equal or closest to the target weight.

Reference will be had to FIG. 1 to describe the structure and operation of a conventional computer scale. Reference numeral 11 denotes a main feeder of vibratory conveyance type. Articles to be weighed are introduced into the main feeder 11 and imparted with vibratory motion so as to be dispersed radially outward from the center of the main feeder. Numerals 12, 12, ... denote n-number of weighing stations which are arranged around the main feeder 11 along radially extending lines to receive the articles dispersed by the main feeder. Each weighing station 12 includes a dispersing feeder 12a, a holding vessel 12b, a holding vessel gate 12c, a weighing hopper 12d, a weight sensor 12e, and a weighing hopper gate 12f. The dispersing feeder 12a comprises an independently vibratable conveyance device for feeding the articles by means of vibration, or an independently operable shutter device for delivering the articles in batches. In either case, each dispersing feeder 12a is so arranged that the articles received from the centrally located main feeder 11 can be introduced into the corresponding holding vessel 12b disposed therebelow. The holding vessel gate 12c is provided on each holding vessel 12b in such a manner that the articles received in the holding vessel are released into the weighing hopper 12d when the gate 12c is opened. Each weight sensor 12e is attached to the corresponding weighing hopper 12d and is operable to measure the weight of the articles introduced into the weighing hopper. The weight sensor 12e is adapted to supply a combination computing unit with an electrical signal indicative of the measured weight. The combination computing unit then selects the best combination of articles that gives a total weight closest to a preset target weight. Each of the weighing hopper gates 12f is provided on the corresponding weighing hopper 12d. The combination control unit, upon receiving the signals from each of the weight sensors 12e, responds by opening the weighing hopper gates 12f only of those weighing hoppers 12d that will give the best combination of articles, as mentioned above. The articles from the weighing hoppers 12d selected in this manner fall through the open weighing hopper gates and are discharged into a common collecting chute 13 where they are collected together. The collecting chute 13 has the shape of a funnel and is so arranged as to receive the articles from any of the circularly arrayed weighing hoppers 12d via the hopper gates, which are located above the funnel substantially along its outer rim. The articles received by the collecting chute 13 are collected at the centrally located lower end thereof by falling under their own weight or by being forcibly shifted along the inclined wall of the funnel by a mechanical scraper or the like, which is not shown. The collecting chute 13 is provided with a timing hopper 14 at the lower end thereof for temporarily holding the collected articles. The arrival of an externally applied signal from a packing device or the like causes the timing hopper 14 to release the retained articles from the weighing apparatus, namely from collecting chute 13 which constitutes the lowermost stage of the apparatus, to a separate item of equipment, such as the packing device.

The operation of the above arrangement will now be described in greater detail. At the beginning the holding vessels 12b and weighing hoppers 12d contain a supply of the articles. The weight sensors 12e associated with the respective weighing hoppers 12d measure the weight of the articles in each hopper and produce weight values $L_1$ through $L_{10}$ which are sent to the combination computing unit. The computing unit performs an arithmetic combination computing operation using the weight values $L_1$ through $L_{10}$ and selects the combination of articles that gives a total weight closest to the set target weight. A drive control unit (not shown) opens the weighing hopper gates 12f which are selected on the basis of the best combination, whereby the selected weighing hoppers discharge their articles into the collection chute 13. This will leave the selected weighing hoppers 12d empty. Now the holding vessel gates 12c of those holding vessels 12b corresponding to the empty weighing hoppers 12d are opened to introduce a fresh supply of the articles into said weighing hoppers, leaving said holding vessels empty. Next, the dispersing feeders 12a which correspond to the empty holding vessels 12b are vibrated for a predetermined period of time to deliver a fresh supply of the articles to said holding vessels. This restores the weighing apparatus to the initial state to permit resumption of the computing operation for selecting the best weight combinations in the manner described. Automatic weighing by the combinatorial scale proceeds in continuous fashion by repeating the foregoing steps.

Articles which can be dealt with effectively with the combinatorial weighing apparatus of FIG. 1 are limited to bulky, easily separable items such as fruits, vegetables and confectioneries, which can be dispersed and transferred from one part of the weighing apparatus to another because of their ability to move freely. Products such as raw meat tend to adhere to one another and to the equipment and, hence, cannot be handled by the conventional combinatorial weighing apparatus.

BRIEF SUMMARY OF THE INVENTION

Accordingly, an object of the present invention is to provide a combinatorial weighing method and apparatus for combinatorially weighing articles which do and do not have the ability to move freely.

Another object of the present invention is to provide a combinatorial weighing method and apparatus adaptable to a conveyance system of the type that relies upon a conveyor to transport a plurality of buckets carrying articles to be weighed.

Still another object of the present invention is to provide a combinatorial weighing method and apparatus wherein only a single weight sensor need be provided to weigh articles.

A further object of the present invention is to provide a combinatorial weighing method and apparatus wherein the empty weight of each of a plurality of buckets is previously stored in memory, the total weight of a bucket and its articles is sensed by a weight sensor, the weight of the empty bucket is subtracted from the total weight to provide the weight of the articles carried in the bucket, and the weight obtained is used in a combination computing operation.

Other features and advantages of the invention will be apparent from the following description taken in conjunction with the accompanying drawings.

BRIEF DESCRIPTION OF THE DRAWINGS

FIGS. 6 and 7 are timing charts.

DESCRIPTION OF THE PREFERRED EMBODIMENT

Figure 1:
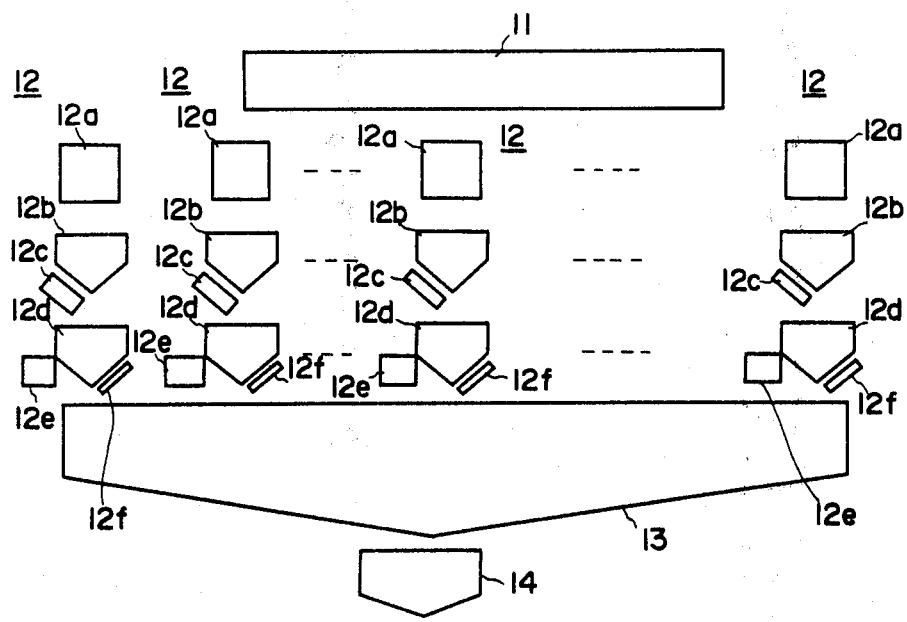
FIG. 1 is a diagrammatic view showing the general features of a conventional combinatorial weighing apparatus.
Figure 2:
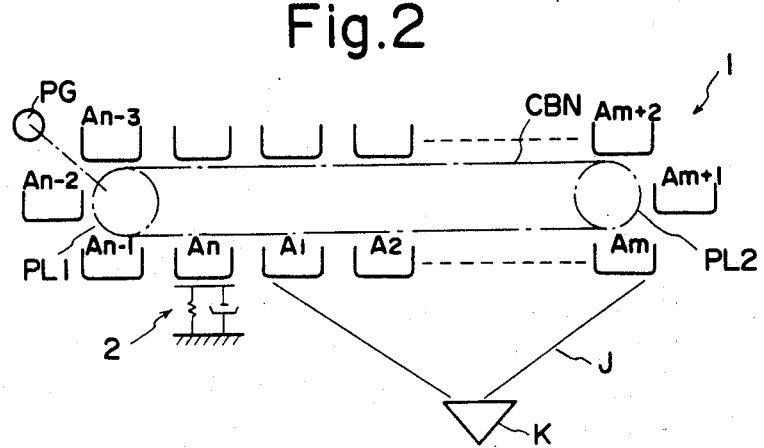
FIG. 2 is a diagram showing the arrangement of a bucket conveyor and a weighing machine employed in a combinatorial weighing apparatus according to the present invention.

Reference will now be had to FIG. 2 which shows the arrangement of a bucket conveyor 1 and weighing machine 2 used in a combinatorial weighing apparatus according to the present invention. The bucket conveyor 1 includes n-number of buckets $A_1, A_2, \ldots, A_n$ for carrying articles to be weighed, of which m-number of buckets are capable of participating in a combinatorial weighing operation. The weighing machine 2, namely a weight sensor, is adapted to weigh the individual buckets A one after another as they are carried to the weighing machine by the bucket conveyor 1. Each of the buckets $A_1, A_2, \ldots, A_n$ is arranged to release its contents into a guiding chute J in response to a drive signal. The chute J is adapted to gather the released articles together and store them temporarily in a pool hopper K which, in response to a discharge signal from an external packaging machine (not shown), discharges the articles which it has received from the chute J. These articles are sent to the packaging machine. The bucket conveyor 1 may include a motor (not shown), a pair of pulleys $PL_1$, $PL_2$ driven by the motor, and an endless chain, belt or wire CBW, stretched between the pulleys $PL_1$, $PL_2$, for supporting the buckets. A pulse generator PG is mounted on the motor or on one of the pulleys and is adapted to generate a single pulse whenever the motor or pulley rotates by an amount equivalent to the spacing between adjacent buckets, which spacing will be referred to as the bucket pitch.

Figure 3:
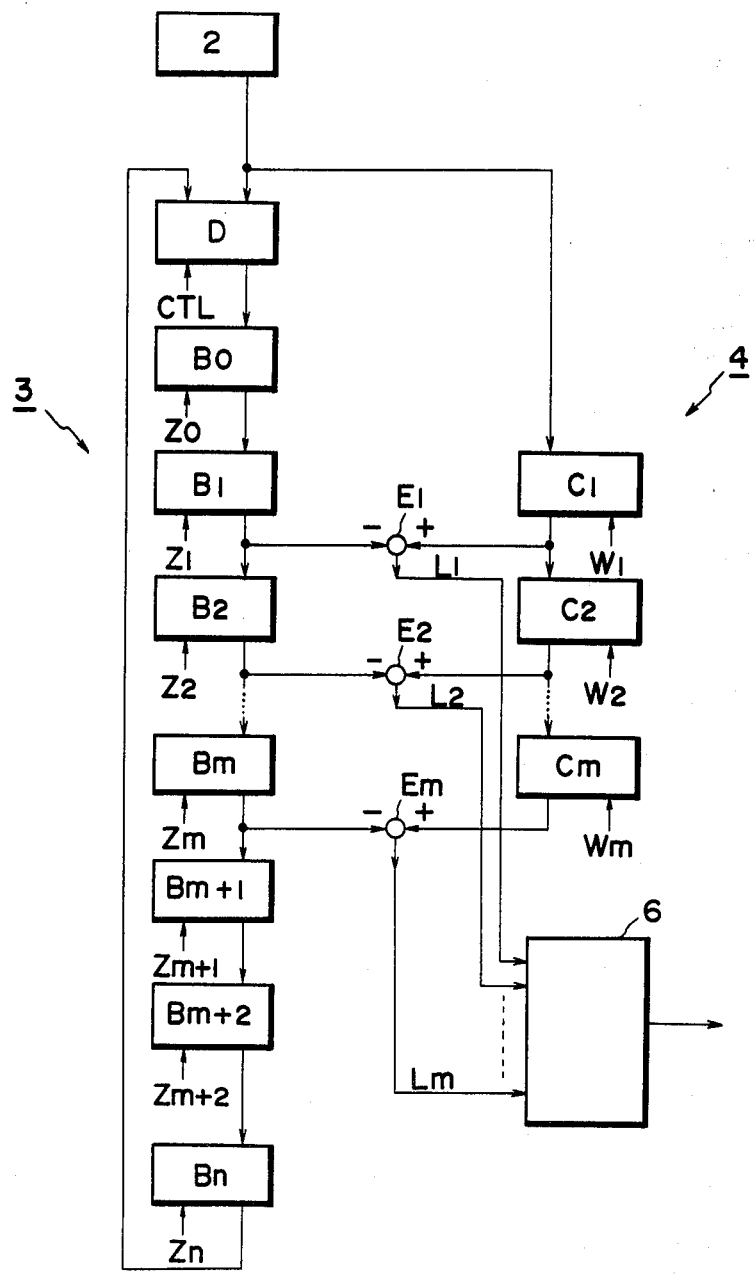
FIG. 3 is a circuit block diagram of a combinatorial weighing apparatus according to the present invention.

FIG. 3 is a block diagram showing the construction of an electronic circuit for performing a combinatorial weighing operation through use of the bucket conveyor 1 and weighing machine 2 described above.

The electronic circuit shown in FIG. 3 includes tare memories $B_1, B_2, \ldots, B_n$ corresponding to respective ones of the n-number of buckets $A_1, A_2, \ldots, A_n$ carried on the bucket conveyor 1, weight memories $C_1, C_2, \ldots, C_m$ corresponding to respective ones of the m-number of buckets A that participate in combinatorial weighing operations, a buffer memory $B_o$ whose output is connected to the input side of tare memory $B_1$, and an input changeover switch D whose output is connected to the input side of buffer memory $B_o$. The buffer memory $B_o$ and tare memories $B_1$ through $B_n$ constitute a tare memory group 3, and the weight memories $C_1$ through $C_m$ constitute a weight memory group 4. The memory groups 3 and 4 each comprise a shift register. The input changeover switch D is composed of a multiplexer or the like and is adapted to provide the buffer memory $B_o$ selectively with weight data from the weighing machine 2 or with data obtained from the tare memory $B_n$. The input changeover switch D responds to a changeover signal CTL by selecting the weight data when the signal CTL is logical "0", or the data from the tare memory $B_n$ when the signal CTL is logical "1". The weight data from weighing machine 2 is delivered to the input changeover switch D and to the weight memory $C_1$ simultaneously. Each memory in the memory groups 3 and 4, each of which comprises a shift register as mentioned above, is adapted to store its respective input signal and to simultaneously deliver the signal, in response to respective control signals $Z_o \ldots Z_n$ and $W_1 \ldots W_m$ which arrive from a decoder signal generator DSG, to be described below. $E_1, E_2, \ldots, E_m$ denote subtracting units for computing the arithmetic difference between the data stored in the weight memories $C_1, C_2, \ldots, C_m$ and the data stored in the tare memories $B_1, B_2, \ldots, B_m$ corresponding to the weight memories $C_1, C_2, \ldots, C_m$. The output from each subtracting unit, namely the result of the subtraction operation, is delivered to a combination compusing unit 6. These output signals represent the weight $L_1, L_2, \ldots, L_m$ of the articles in the respective buckets.

The combination computing unit 6 is adapted to compute combinations on the basis of the weight values $L_1$ through $L_m$ received from the subtracting units $E_1$ through $E_m$, and to deliver a signal indicative of the combination of articles whose total weight is equal or closest to a preset target weight. The combination computing unit 6 is illustrated in greater detail in FIG. 4.

Figure 4:
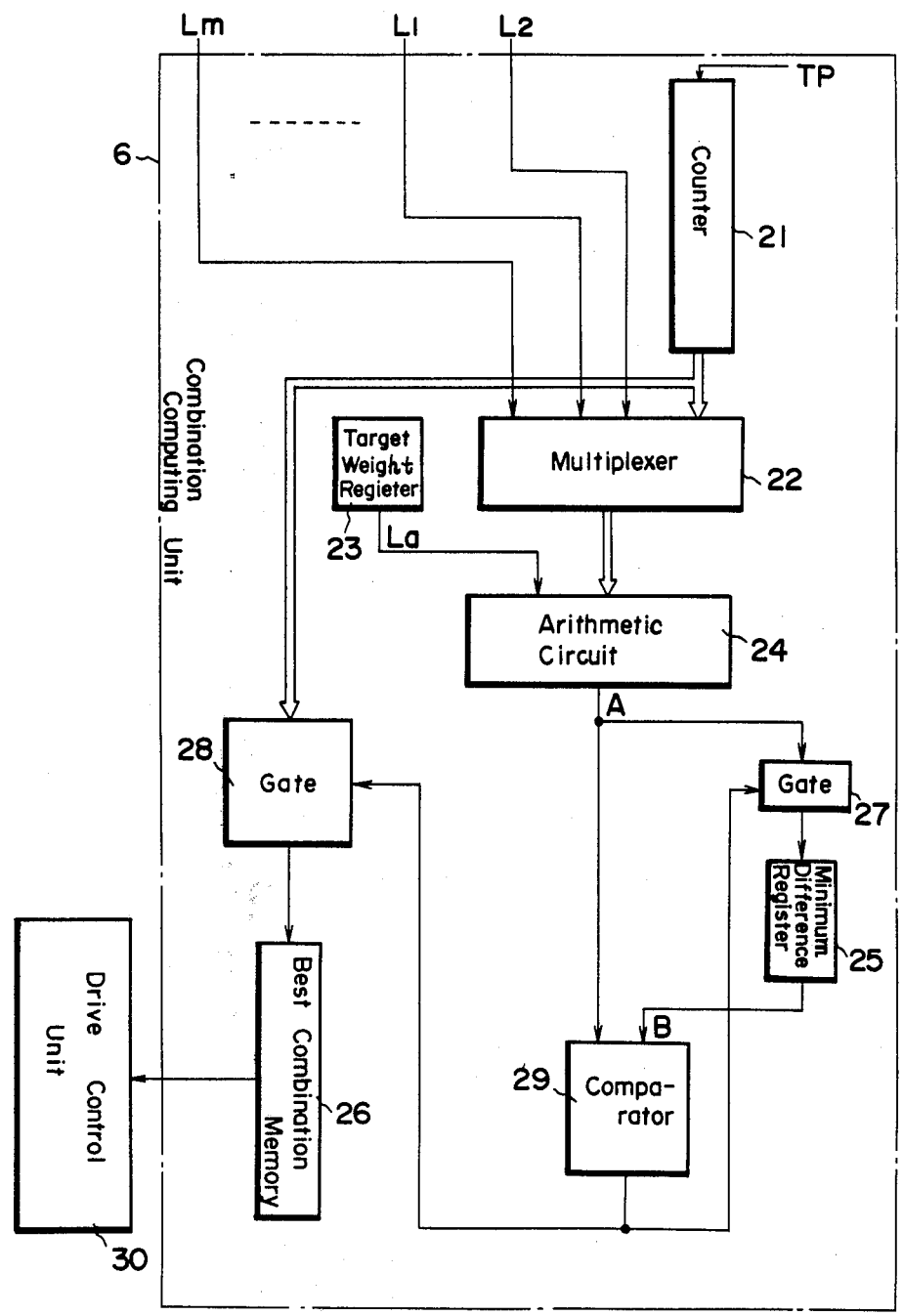
FIG. 4 is a block diagram of a combination computing unit.

As shown in FIG. 4, the combination computing unit 6 includes an m-bit binary counter 21, which counts timing pulses TP of a prescribed frequency, for generating combination patterns of the m-number of weight values $L_1$ through $L_m$. That is, for m-number of buckets, m combinations are possible when each combination is composed of one bucket selected from the total of m buckets, $m(m-1)/2!$ combinations are possible when each combination is composed of two buckets selected from said total, and, in general, $(m(m-1)(m-2) \ldots (m-r+1)/r!$ combinations are possible when each combination is composed of r-number of buckets selected from said total of m buckets. Accordingly, when the m-bit binary counter 21 has counted $2^m - 1$ timing pulses TP, a total of $2^m 1$ different bit patterns, from 000 ... 001 to 111 ... 111, will have been generated. Then, if a correlation is established between the first bit and the first weight value $L_1$, the second bit and the second weight value $L_2$, and between the third m-th bits and the third through m-th weight values, then the bit pattern will be an indication of the above-mentioned combination pattern. In other words, each bit pattern will represent a specific combination of the weight values $L_1$ through $L_m$. The bit pattern from the counter 21 is applied to a multiplexer 22 which provides an arithmetic circuit 24 with the weight values specified by the bit pattern. For instance, when m=10, assume that the combination pattern is 1000101011. This means that the arithmetic circuit 24 will receive the first, second, fourth, sixth and tenth weight values $L_1$, $L_2$, $L_4$, $L_6$, $L_{10}$. The arithmetic circuit 24, in addition to the weight values $L_1$ through $L_{10}$, receives a preset target weight $L_a$ from a target weight register 23 which stores the target weight $L_a$. The arithmetic circuit 24 computes the difference between the target weight $L_a$ and the total weight $\Sigma L_i$ of the weight values received from the multiplexer 22, and produces a signal indicative of the absolute value of the computed difference. More specifically, the arithmetic circuit 24 performs the operation $|\Sigma L_i - L_a| = A$. Hereinafter, A will be referred to as the difference value. This values is applied to a minimum difference register 25 which is preset to the target weight $L_a$, and which is thereafter updated in a manner to be described below. Numeral 26 denotes a best combination memory for storing the best combination pattern. Numeral 27 denotes a gate for gating signals to the minimum difference register 25, and 28 a gate for gating signals to the best combination memory 26. A comparator 29 is adapted to compare the magnitude of the difference value A from the arithmetic circuit 24, with the magnitude of a minimum difference value B stored in the minimum difference register 25. When the inequality A<B holds, the output of comparator 29 is such that the difference value A is delivered for storage to the minimum difference register 25 through the gate 27, and the content (combination pattern) of counter 21 is delivered for storage to the best combination memory 26 through the gate 28. The output of the best combination memory 26, namely a signal indicating the best combination pattern, is applied to a drive control unit 30 which, in accordance with the combination pattern, opens the corresponding buckets (FIG. 2) so that these buckets may release their contents into the guiding chute J.

In operation, the m-bit counter 21 (where m shall be equal to ten in this example) counts the timing pulses TP of a prescribed frequency to produce $2^m - 1$ combination patterns. Thus, when the first timing pulse TP arrives and is counted, the content of counter 21 becomes 0000000001. As a result, the multiplexer 22 sends the first weight value $L_1$ to the arithmetic circuit 24 which responds by computing the difference value $A$ $(=|L_1 L_a|)$, namely the absolute value of the difference between the set target weight La and the total weight of the combination. Here $L_1$ is the total weight since $L_1$ is the only weight value in this combination. The comparator 29 compares the limit value A with the content B (initially set to the target weight $L_a$) of the minimum difference register 25. Since the inequality A<B obviously will hold in this case, the comparator 29 causes the difference value A to be transferred to the minimum difference register 25 through the gate 27, and causes the content (combination pattern 0000000001) of counter 21 to be stored in the best combination memory 26 through the gate 28. Thenceforth the second timing pulse TP is generated and counted by counter 21, whose content (combination pattern) is incremented to 0000000010. The second weight value $L_2$ is thus delivered to the arithmetic circuit 24 which computes the difference value $A$ $(=|L_2 - L_a|)$ and sends it to the comparator 29. Here the value A is compared with the content $B$ $(=|L_1 - L_a|)$ of the minimum difference register 25. If the relation A≧B holds, the comparator does not update the register 25 and best combination memory 26. If the inequality A<B still holds, however, the comparator updates the register 25 with the current difference value A, and updates the memory 26 with the content (now 0000000010) of counter 21. The operation described above is repeated until all $2^m - 1$ combinations have been generated. At such time the content of the minimum difference register 25 will be the minimum difference value obtained from the $2^m - 1$ combinations, and the content of the best combination memory 26 will be the combination pattern that gave said minimum value. The best combination pattern thus is selected from the total of $2^m - 1$ possible combination patterns. The memory 26 sends a signal indicative of this pattern to the drive control unit 30 which, on the basis of this pattern, opens the corresponding buckets to supply the guiding chute J (FIG. 2) with the articles released thereby. The batch of articles delivered in this manner are those that make up the best combination. This completes one combinatorial weighing cycle, which may be repeated as often as required to provide batches of the articles, each batch having a total weight equal or closest to the set target weight $L_a$.

Figure 5:
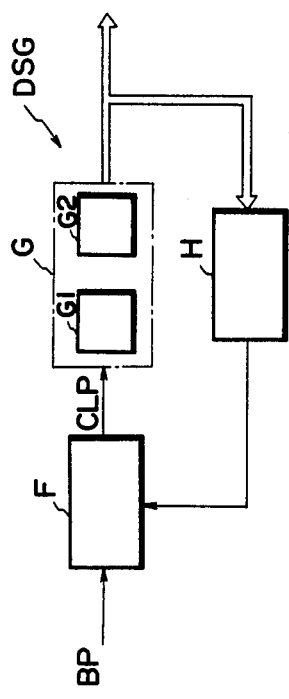
FIG. 5 is a block diagram of a decode signal generator.

Next, reference will be had to FIG. 5 to describe the construction of the abovementioned decode signal generator DSG which supplies the tare memory group 3 and weight memory group 4 with the control signals $Z_o$ through $Z_n$ and $W_1$ through $W_m$. The decode signal generator DSG includes a clock pulse generator F adapted to generate a plurality of clock pulses CLP whenever the bucket conveyor 1 travels a distance equal to one bucket pitch, that is, whenever the pulse generator PG (FIG. 2) produces a pulse BP, a counter $G_1$ for counting the clock pulses CLP, a decoder $G_2$ which decodes the content of the counter $G_1$ and produces (n−1)-number of control signals, which counter $G_1$ and decoder $G_2$ constitute a decode signal generating section G, and a switch H for halting the operation of the clock pulse generator F.

The overall operation of the combinatorial weighing apparatus of the present invention will now be described in conjunction with the time charts shown in FIGS. 6 and 7.

At the beginning of the weighing operation, the empty weight of each of the n-number of buckets $A_1$ through $A_n$ carried on the conveyor 1 is stored in a corresponding one of the tare memories $B_1$ through $B_n$. This is accomplished in the following manner.

Figure 6:

As shown in FIG. 6, a start signal ST goes to logical "1". This may occur automatically when the apparatus is supplied with power, or by a manual operation such as the closure of a switch. In response to the "1" logic the conveyor motor begins rotating the bucket conveyor 1 to bring the first empty bucket $A_1$ into position on the weighing machine 2. Since the conveyor 1 travels a distance equal to one bucket pitch, the pulse generator PG produces the pulse BP. The clock pulse generator F of the decode signal generator DSG in FIG. 5 responds to the pulse BP by generating a plurality of the clock pulses CLP. These are counted by the counter $G_1$, the content whereof is decoded by decoder $G_2$, whereby decode signals $Q_o, Q_1, \ldots, Q_n$ are produced one after another as each clock pulse CLP is produced. The decode signals $Q_o, Q_1, \ldots, Q_n$ correspond to the control signals $Z_o, Z_n, \ldots, Z_1$. Buffer memory $B_o$ stores the output signal of the input changeover switch D upon receipt of the decoder signal $Q_o$, namely the control signal $Z_o$. At this time the changeover signal CTL input to the changeover switch D is at logical "0", so that the switch D selects the signal from the weighing machine 2 for delivery to the buffer memory $B_o$. Since the empty bucket $A_1$ has been set upon the weighing machine 2 by the bucket conveyor 1 as described above, the value stored in the buffer memory $B_o$ is the empty weight of bucket $A_1$. Next, the decode signal generator G produces the decode signal $Q_1$, i.e., control signal $Z_n$, whereupon the tare memory $B_n$ responds by storing the data from the immediately preceding tare memory $B_{n-1}$. When the decode signal $Q_2$ (control signal $Z_{n-1}$) is generated, the data in tare memory $B_{n-1}$ similarly replaced by the data in the immediately preceding tare memory $B_{n-2}$. Thus, data is shifted from one tare memory to the next adjacent tare memory in accordance with the arrival of the decode, or control, signals. When the last decode signal $Q_n$ (control signal $Z_1$) is produced owing to the generation of n-number of clock pulses CLP, the empty weight of bucket $A_1$, stored initially in tare memory $B_1$, is shifted into tare memory $B_1$. After the generation of the n-number of clock pulses CLP, the switch H applies a disable signal END to the clock pulse generator F to halt the generation of the clock pulses CLP. The bucket conveyor 1, however, is still operative. When the next empty bucket $A_2$ is set upon the weighing machine 2, therefore, the pulse generator PG produces the pulse BP, in response to which the foregoing series of operations is repeated to store the empty weight of bucket $A_2$. To store the empty weight of each of the buckets $A_1$ through $A_n$, therefore, the foregoing series of operations is performed n times. When this has been accomplished, the changeover signal CTL goes to logical "1", the tare memory cycle ends, and the bucket conveyor 1 is brought to a stop. Besides stopping the bucket conveyor 1, it is also possible to shift immediately to a computation cycle, as will be described below.

Through the foregoing tare memory cycle, therefore, the empty weights of the buckets $A_1$ through $A_n$ are stored in the tare memories $B_n$ through $B_1$, respectively. That is, the empty weight of bucket $A_n$ is stored in tare memory $B_1$, that of bucket $A_{n-1}$ is tare memory $B_2$, and so on up to bucket $A_1$, whose empty weight is stored in tare memory $B_n$.

During the generation of the decode signals by means of the decoder $G_2$, the decode signals $Q_{n-m+1}, Q_{n-m+2}, \ldots, Q_n$ serve as the control signals $W_m, W_{m-1}, \ldots, W_1$, respectively. Upon completion of the tare memory cycle, therefore, the data stored in the weight memories $C_1$ through $C_m$ will be the same at the data stored in the corresponding tare memories $B_1$ through $B_m$. This is because the data delivered to buffer memory $B_o$ from the weighing machine 2 is delivered also to weight memory $C_1$, and because the data in one weight memory is shifted to the next adjacent weight memory in accordance with the arriving control signals $W_m$ through $W_1$, as described in connection with the tare memory cycle. Owing to this equivalence of data between memories $B_1$ and $C_1$, $B_2$ and $C_2$, and so on up to memories $B_m$ and $C_m$, the outputs of the subtracting units $E_1$ through $E_m$ will be zero throughout the tare memory cycle.

After each empty bucket is weighed and has its empty weight stored in the above fashion, the bucket is supplied with a suitable quantity of the articles which are to be weighed. When all n of the buckets $A_1$ through $A_n$ have been weighed and supplied with the articles, the first bucket $A_1$ will be returned to the weighing machine 2 by the bucket conveyor 1 to start the weighing cycle. At this time the changeover signal applied to the input changeover switch D will be at logical "1", as mentioned above, so that the switch D will select the content of tare memory $B_n$. When the decode pulses $Q_o, Q_1, \ldots, Q_n$ are delivered by the decoder $G_2$, therefore, as shown in FIG. 7, the data in tare memory $B_n$ is transferred to buffer memory $B_o$ owing to the arrival of pulse $Q_o$ (pulse $Z_o$), the data in tare memory $B_{n-1}$ is shifted to tare memory $B_n$ owing to the arrival of pulse $Q_1$ (pulse $Z_n$), and so on, as described in connection with the tare memory cycle. The difference between the tare memory cycle and the weighing cycle is that, in the former, new data continually enters the tare memory group 3 from the weighing machine 2, the new data being the empty weight of each bucket. In the weighing cycle, however, the data which enters the buffer memory $B_o$ through the switch D is the content already stored in tare memory $B_n$. Thus the data shifted to tare memory $B_1$ from buffer memory $B_o$ at the end of the weighing cycle is equivalent to the content of tare memory $B_n$, so that it is the tare data previously stored during the tare memory cycle that is shifted sequentially through the tare memory group 3; no new data enters from the weighing machine 2. In the weight memory group 4 consisting of the weight memories $C_1$ through $C_m$, on the other hand, new data constantly enters from the weighing machine 2 and is sequentially shifted through the memories. At the start of the weighing cycle, therefore, the data which is stored in weight memory $C_1$ is the total weight of bucket $A_1$ (empty weight + weight of articles) delivered by the weighing machine 2. From this data the subtracting unit $E_1$ subtracts the empty weight data of bucket $A_1$ stored in tare memory $B_1$, thereby producing a signal indicative of the weight of the articles carried in bucket $A_1$. This signal, representing the weight value $L_1$ described previously, is coupled to the combination computing unit 6. At this time the outputs of subtracting units $E_2$ through $E_m$ are still zero because the contents of weight memories $C_2$ through $C_m$ are still the same as the contents of tare memories $B_2$ through $B_m$, respectively. When the subtracting units $E_1$ through $E_m$ have delivered their outputs ($L_1$ through $L_m$) to the combination computing unit 6, a computation start pulse CST is produced, the computing unit 6 responding by performing a combination computing operation on the basis of the m-items of data produced whenever the timing pulses TP are generated (FIG. 4). The first combination computing operation ends when $2^m - 1$ of the timing pulses TP are generated.

Upon completion of the first combination computing operation, the bucket conveyor 1 is actuated to bring the second bucket $A_2$ to the weighing machine 2. The weighing machine 2 sends the weight data for bucket $A_2$ to weight memory $C_1$, so that the output of subtracting unit $E_1$ is now the weight of the articles in bucket $A_2$, found by subtracting the empty weight of bucket $A_2$ (which is now the data in tare memory $B_1$) from the total weight of the bucket. The output of subtracting unit $E_2$ is the weight of the articles contained in bucket $A_1$, since the memories $B_2$, $C_2$ now hold the data stored preciously in memories $B_1$, $C_1$, respectively. Under these conditions the second combination computing operation is performed in the manner described above. The foregoing steps are repeated to bring one bucket after another to the weighing machine 2 until the m-th bucket $A_m$ arrives at the weighing machine and has its total weight measured and stored in weight memory $C_1$. When this occurs the outputs of the subtracting units $E_1$ through $E_m$ will represent the weights of the articles in the buckets $A_1$ through $A_m$, respectively. Thereafter, previous data stored in weight memory $C_m$ is cancelled whenever the buckets A are conveyed by m-number of bucket pitches, so that the outputs of subtracting units $E_1$ through $E_m$ will give a constant indication of the article weights in the m-number of buckets A. Further, a combination computation operation is performed on the basis of these m-items of data each time the buckets are conveyed by m-number of bucket pitches. As a result, buckets selected by the combination computation operation are caused to release their articles following the next conveyance operation through the distance of m bucket pitches. Those buckets which have released their articles and then returned are refilled with a fresh supply before arriving at the weighing machine to be reweighed.

A combinatorial weighing apparatus according to the present invention as described and illustrated hereinabove need have only a single weighing machine cooperating with the bucket conveyor, as opposed to the conventional apparatus of this kind which requires a plurality of weighing machines to perform the combination computation. Large-sized pool hoppers and weighing hoppers are unnecessary, so that the overall apparatus is simplified in construction.

The combinatorial weighing apparatus of the invention is based on a very simple operation in which articles are introduced afresh into buckets that have returned after releasing the articles previously supplied them. As a result, the apparatus can be applied not only to articles which are capable of being weighed automatically, but also to articles which until now have not had such capability because they cannot be introduced into the weighing system automatically. The present invention makes it possible to weight such articles automatically by introducing into the system manually. Batches of the articles having a total weight equal or closest to a set target weight can be obtained in a short period of time since computations are performed electronically. Moreover, weighing efficiency and performance are enhanced since those articles that do not contribute to the best combination are not released from their buckets but are reweighed for use in subsequent combination computation operations.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method in a combinatorial weighing apparatus of the type having a plurality of buckets for carrying articles to be weighed, a conveyor for conveying each of the buckets, and a weight sensor for sensing the weight of each bucket, which method comprises the steps of:
   (a) storing in memory the empty weight of each bucket following the measurement thereof by the weight sensor;
   (b) storing in memory the total weight of each bucket and the articles introduced into said bucket, said total weight of the bucket and its articles being measured by the weight sensor;
   (c) producing a signal indicative of the weight of the articles in each bucket by subtracting from said total weight of the bucket and its articles the empty weight of the bucket;
   (d) selecting the combination of articles whose overall weight is equal or closest to a preset target weight; and
   (e) releasing the selected articles from the buckets which carry them.

2. The combinatorial weighing method according to claim 1, in which the empty weight of each bucket is stored in a first memory, and the total weight of each bucket and the articles introduced into said bucket is stored in a second memory, said first and second memories each comprising a shift register.

3. The combinatorial weighing method according to claim 2, in which the step (a) includes a first step of measuring the empty weight of each bucket by said weight sensor each time the buckets are moved one bucket pitch by the conveyor, a second step of shifting the data stored in said first memory by one bit and storing the measured empty weight in the most significant bit of said first memory each time the buckets are moved one bucket pitch by the conveyor, and a third step of repeating said second step for all of the buckets.

4. The combinatorial weighing method according to claim 3, in which the step (b) includes a first step of measuring the total weight of each bucket and the articles introduced into said bucket by the weight sensor each time the buckets are moved one bucket pitch by the conveyor, a second step of shifting the data stored in said second memory by one bit and storing the measured total weight in the most significant bit of said second memory each time the buckets are moved by one bucket pitch, and a third step of repeating said second step for a predetermined number of the buckets.

5. A combinatorial weighing apparatus for finding the weights of articles carried in a plurality of buckets, selecting the combination of articles whose overall weight is equal or closest to a preset target weight, and releasing the selected articles from the buckets which carry them, said apparatus comprising:

a plurality of buckets for carrying articles to be weighed;

a conveyor for conveying each of the buckets;

a weight sensor for sequentially measuring the weight of each bucket conveyed to said sensor by said conveyor;

a first memory comprising a shift register for storing the empty weight of each bucket measured, when empty, by said weight sensor;

a second memory comprising a shift register for storing the total weight of each bucket and the articles introduced into said bucket, said total weight of the bucket and articles being measured by said weight sensor when said bucket is carrying the articles;

subtracting means for producing a signal indicative of the weight of the articles in each bucket by subtracting from said total weight of the bucket and its articles the empty weight of the bucket; and best combination computing means for selecting and delivering, on the basis of the measured weights of the articles, the combination of articles whose overall weight is equal or closest to the preset target weight.

6. The combinatorial weighing apparatus according to claim 5, further comprising pulse generating means for generating a pulse each time the buckets are moved one bucket pitch by said conveyor, the data stored in said first and second memories being shifted in synchronism with the generated pulses.

* * * * *

UNITED STATES PATENT AND TRADEMARK OFFICE
CERTIFICATE OF CORRECTION

PATENT NO. : 4,418,772
DATED : December 6, 1983
INVENTOR(S) : Fukuda

It is certified that error appears in the above-identified patent and that said Letters Patent is hereby corrected as shown below:

Col. 4, line 65, "m" should be --$\underline{m}$--;
       line 66, "m" should be --$\underline{m}$--.
Col. 5, line 4, "m" should be --$\underline{m}$--;
       line 6, "$2^m$" should be --$2^{\underline{m}}$--;
       line 31, "A" should be --$\underline{A}$--;
       line 32, "values" should be --value--;
       line 56, "m" should be --$\underline{m}$--;
       line 64, "$(=|L_1 La|)$" should be --$(=|L_1 - L_a|)$--.
Col. 6, line 41, "abovementioned" should be --above-mentioned--.
Col. 7, line 28, before "similarly" insert --is--;
       line 47, "n" should be --$\underline{n}$--.
Col. 8, line 14, "n" should be --$\underline{n}$--;
       line 19, '"»1"' should be --"1"--.
Col. 9, line 31, "m" should be --$\underline{m}$--.

Signed and Sealed this

Twenty-fifth Day of September 1984

[SEAL]

Attest:

GERALD J. MOSSINGHOFF

Attesting Officer     Commissioner of Patents and Trademarks